United States Patent
You et al.

(10) Patent No.: US 9,747,087 B2
(45) Date of Patent: Aug. 29, 2017

(54) VARIABLE INFERENCE SYSTEM AND METHOD FOR SOFTWARE PROGRAM

(71) Applicant: Institute For Information Industry, Taipei (TW)

(72) Inventors: Yi-Ping You, Taichung (TW); Si-Hao Wu, Hsinchu (TW); Yu-Jung Cheng, Yuanshan Township (TW); Jing-Fung Chen, New Taipei (TW)

(73) Assignee: Institute For Information Industry, Taipei (TW)

( * ) Notice: Subject to any disclaimer, the term of this patent is extended or adjusted under 35 U.S.C. 154(b) by 389 days.

(21) Appl. No.: 14/604,973

(22) Filed: Jan. 26, 2015

(65) Prior Publication Data

US 2016/0147512 A1    May 26, 2016

(30) Foreign Application Priority Data

Nov. 25, 2014    (CN) .......................... 2014 1 0685318

(51) Int. Cl.
  *G06F 9/45* (2006.01)
  *G06N 5/04* (2006.01)

(52) U.S. Cl.
  CPC .............. *G06F 8/443* (2013.01); *G06N 5/04* (2013.01)

(58) Field of Classification Search
  None
  See application file for complete search history.

(56) References Cited

U.S. PATENT DOCUMENTS

| | | | |
|---|---|---|---|
| 2015/0058830 A1* | 2/2015 | Verlaguet .............. | G06F 9/3846 717/136 |
| 2016/0170724 A1* | 6/2016 | Mahaffey ................ | G06F 8/315 717/151 |

\* cited by examiner

*Primary Examiner* — Evral E Bodden
(74) *Attorney, Agent, or Firm* — Skaar Ulbrich Macari, P.A.

(57) ABSTRACT

A variable inference system and a variable inference method for a software program are provided. The variable inference system and method calculate a first variable type output corresponding to an unknown variable for a plurality of first basic blocks of a software program. The variable inference system and method calculate a second variable type input corresponding to the unknown variable for a second basic block of the software program. The variable inference system and method calculate a second variable type generation when the second basic block includes a primitive instruction corresponding to the unknown variable. The variable inference system and method calculate a second variable type kill. The variable inference system and method calculate a second variable output corresponding to the unknown variable for the second basic block according to the second variable type input, the second variable type generation and the second variable type kill.

20 Claims, 6 Drawing Sheets

VARIABLE INFERENCE SYSTEM AND METHOD FOR SOFTWARE PROGRAM

PRIORITY

This application claims priority to China Patent Application No. 201410685318.8 filed on Nov. 25, 2014, which is hereby incorporated by reference in its entirety.

FIELD

The present invention relates to a variable inference system and a variable inference method. In particular, the present invention relates to a variable inference system and a variable inference method for a software program.

BACKGROUND

To improve the execution efficiency of a software program, the source codes of the software program may be transcompiled between different program languages. For example, the efficiency at which a JavaScript engine executes JavaScript language program codes is approximately a half of the efficiency at which the JavaScript engine executes native language program codes (e.g., program codes compiled by C or C++ languages). If the JavaScript language program codes are firstly transcompiled into the native language program codes before being executed by the JavaScript engine, the overall execution efficiency will be improved.

The JavaScript language program codes belong to dynamic language program codes involving dynamic typing and dynamic name binding. Dynamic typing means that the type of a variable in the dynamic language program code can be decided only when it is executed, while dynamic name binding means that the same function name in the dynamic language program code may be bound to different functions according to different execution conditions thereof. However, because of the aforesaid properties (i.e., dynamic typing and dynamic name binding), it is difficult to determine the variable type in the dynamic language program code during the process of transcompiling the dynamic language program code into a native language program code. The overall transcompiling efficiency (e.g., increasing the transcompilation time or decreasing the transcompilation accuracy) will then be affected.

Accordingly, it is important in the art to provide an effective variable inference method for use in the process of transcompiling dynamic language program codes into native language program codes.

SUMMARY

An objective of the present invention includes providing an effective variable inference method for use in the process of transcompiling a dynamic language program code into a native language program code.

To achieve the aforesaid objective, certain embodiments of the present invention include a variable inference system for a software program. The variable inference system comprises an input device, a processing device and a storage device. The input device is configured to input the software program. The processing device is connected to the input device and configured to divide the software program into a plurality of basic blocks, wherein the basic blocks include a plurality of first basic blocks and a second basic block. The processing device calculates a first variable type output corresponding to an unknown variable for each of the plurality of first basic blocks. The processing device calculates a second variable type input corresponding to the unknown variable for the second basic block according to the first variable type outputs. The processing device calculates a second variable type generation corresponding to the unknown variable for the second basic block when the second basic block comprises a primitive instruction corresponding to the unknown variable. The processing device calculates a second variable type kill corresponding to the unknown variable for the second basic block. The processing device calculates a second variable type output corresponding to the unknown variable for the second basic block according to the second variable type input, the second variable type generation and the second variable type kill. The storage device is connected to the processing device and configured to store the first variable type output and the second variable type output.

To achieve the aforesaid objective, certain embodiments of the present invention include a variable inference method for a software program. The variable inference method may comprise the following steps:

inputting the software program by an input device;

dividing the software program into a plurality of basic blocks by a processing device, wherein the basic blocks include a plurality of first basic blocks and a second basic block;

calculating a first variable type output corresponding to an unknown variable by the processing device for each of the plurality of first basic blocks and storing the first variable type outputs by a storage device;

calculating a second variable type input corresponding to the unknown variable by the processing device for the second basic block according to the first variable type outputs;

calculating a second variable type generation corresponding to the unknown variable by the processing device for the second basic block when the second basic block comprises a primitive instruction corresponding to the unknown variable;

calculating a second variable type kill corresponding to the unknown variable by the processing device for the second basic block;

calculating a second variable type output corresponding to the unknown variable by the processing device for the second basic block according to the second variable type input, the second variable type generation and the second variable type kill; and storing the second variable type output by the storage device.

According to the above descriptions, the present invention provides a variable inference system and a variable inference method for a software program. The variable inference system and the variable inference method may divide the software program into a plurality of basic blocks, and calculate a variable type input (i.e., variable types inputted into a current basic block), a variable type generation (i.e., variable types generated by the current basic block itself), a variable type kill (i.e., variable types to be killed by the current basic block), and a variable type output (i.e., variable types to be outputted from the current basic block to other basic blocks) for each of the basic blocks. More specifically, the variable inference system and the variable inference method may calculate the variable type input of the current basic block according to the variable type outputs that are calculated for previous basic blocks. The variable inference system and the variable inference method may, according to a primitive instruction in the current basic block, calculate the variable type generation thereof. The variable inference system and the variable inference method may optionally calculate the variable type kill for the current basic block. For each of the basic blocks, the variable inference system and the variable inference method may calculate the variable type output thereof according to the variable type input, the variable type generation and the variable type kill thereof and then store the variable type outputs.

Through the aforesaid operations, variable types of a related unknown variable in the previous basic blocks may directly flow into the current basic block in the form of a data flow, or may be stored into a storage device (e.g., a database). Then, when a variable type of the unknown variable in the current basic block is to be obtained, the present invention may obtain the variable types of the related unknown variable from the previous basic blocks or the storage device, and then infer what the variable type of the unknown variable is in the current basic block. Therefore, even if a certain basic block comprises the dynamic type properties (e.g., dynamic typing and dynamic name binding) of dynamic languages, the present invention may still effectively infer the variable type of the unknown variable according to the variable type information of the unknown variable in the previous basic blocks.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

A brief description of drawings are made as follows, but this is not intended to limit the present invention.

DETAILED DESCRIPTION

In the following description, the present invention will be explained with reference to example embodiments thereof. However, these example embodiments are not intended to limit the present invention to any specific examples, embodiments, environment, applications or particular implementations described in these example embodiments. Therefore, the description of these example embodiments is only for the purpose of illustration rather than to limit the present invention. Elements unrelated to the present invention are omitted from the depiction. Dimensional relationships among individual elements in the attached drawings are illustrated only for ease of understanding, but not to limit the actual scale.

Figure 1:
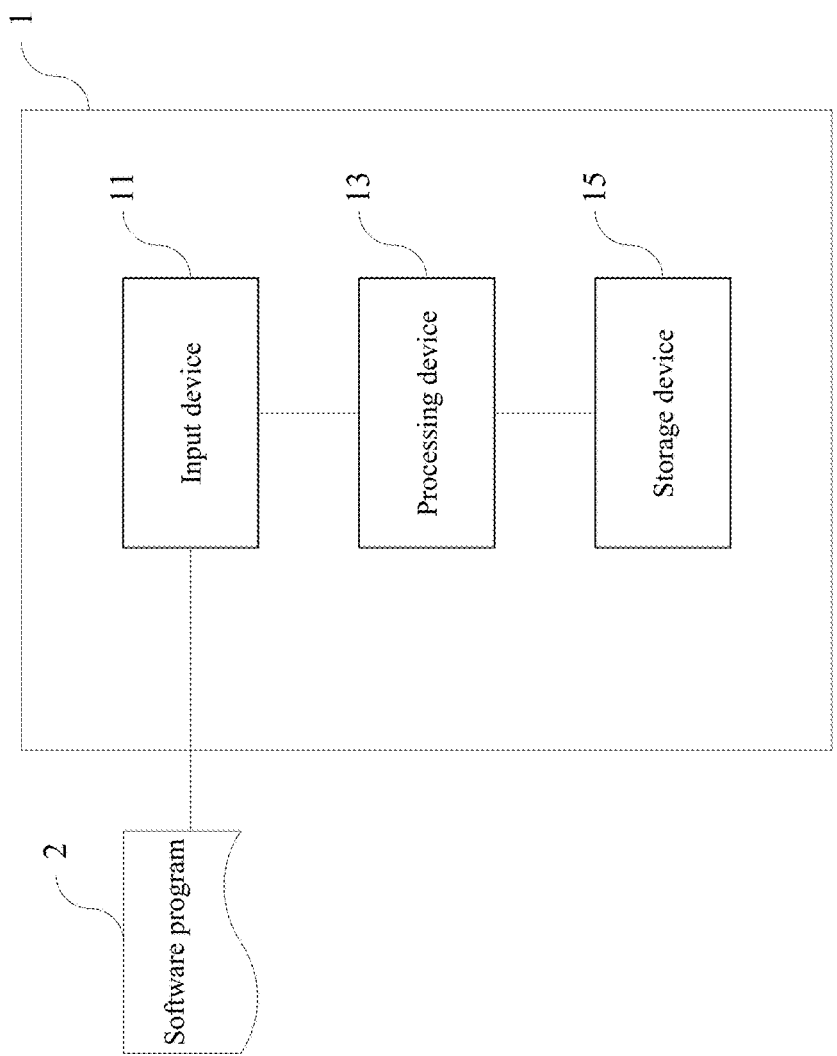
FIG. 1 is a schematic structural view of a variable inference system according to an embodiment of the present invention.

An embodiment of the present invention (briefly called "a first embodiment") is a variable interference system for a software program. FIG. 1 is a schematic structural view of the variable interference system. As shown in FIG. 1, a variable interference system 1 may comprise an input device 11, a processing device 13 and a storage device 15. The input device 11, the processing device 13 and the storage device 15 may connect with and communicate with each other directly or indirectly. The variable interference system 1 may be a computer system or a cloud-based system.

The input device 11 may input at least one software program 2 into the variable interference system 1 via various software program input interfaces. The software program 2 may be a software program generated by various different program compiling tools, and may comprise a dynamic language software program and/or a static language software program. For ease of description, this embodiment assumes that the software program 2 is a JavaScript language program, but this is not intended to limit the present invention. Optionally, the software program 2 inputted into the variable interference system 1 by the input device 11 may be temporarily stored in the storage device 15.

The processing device 13 may obtain the software program 2 from the input device 11 or the storage device 15, and then process the software program 2. Specifically, the processing device 13 may divide the software program 2 into a plurality of basic blocks, which include a plurality of first basic blocks and a second basic block. For example, the processing device 13 may divide the software program 2 into a plurality of basic blocks by using a control flow graph (CFG). The control flow graph is a flow graph representing a software program and comprises a plurality of basic blocks, and establishes paths between the basic blocks through edges. Each basic block comprises at least one primitive instruction. To establish the control flow graph of the software program 2, the processing device 13 may firstly define various intermediate representations (IR), and generate the primitive instruction of each of the basic blocks in the control flow graph according to the intermediate representations. The method in which the processing device defines the intermediate representations may be readily known by those of ordinary skill in the art, and thus, will not be further described herein.

After having defined the intermediate representations, the processing device 13 may, according to various parsers (e.g., a Closure Compiler Parser), firstly construct an abstract syntax tree (AST) of the software program 2 and then traverse nodes on the abstract syntax tree to establish the primitive instruction in each of the basic blocks corresponding to the intermediate representations defined above. In this embodiment, a basic block is generated whenever the processing device 13 traverses a block node on the abstract syntax tree.

Figure 2:
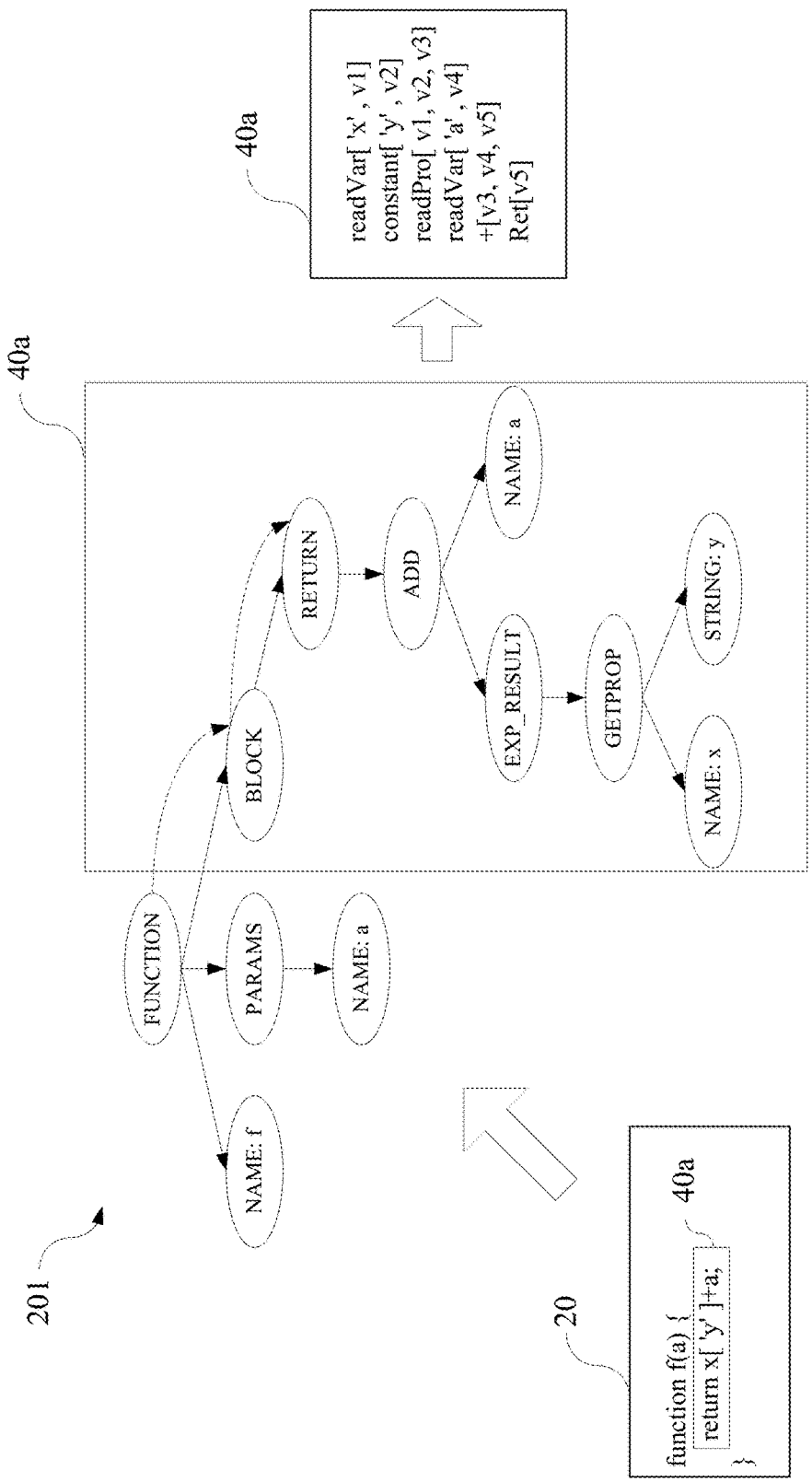
FIG. 2 is a schematic view illustrating an abstract syntax tree and basic blocks thereof of a software language program according to an embodiment of the present invention.

FIG. 2 is a schematic view illustrating an abstract syntax tree of the software program 2 and basic blocks thereof. Taking FIG. 2 as an example, the software program 2 is a JavaScript language program 20. The processing device 13 has established an abstract syntax tree 201 of the JavaScript language program 20. As shown in FIG. 2, the dotted arrows in the abstract syntax tree 201 represent a searching path, which for example sequentially passes a function node (FUNCTION), a block node (BLOCK), and a return node (RETURN). The method in which the processing device 13 establishes the abstract syntax tree 201 of the JavaScript language program 20 may be readily known by those of ordinary skill in the art, and thus, will not be further described herein. As shown in FIG. 2, after having established the abstract syntax tree 201, the processing device 13 will establish a basic block 40a when traversing to the block node (BLOCK) on the abstract syntax tree 201, and each row in the basic block 40a represents a primitive instruction. The primitive instructions are disassembled sequentially.

Corresponding to the JavaScript language program 20, the meanings of the primitive instructions in the basic block 40a may be represented as follows:
v1, v2 and v3 represent temporary storage statuses in a register (e.g., a variable, an object, a property and etc.);
readVar['x', v1] represents that a variable 'x' is read into v1;
constant['y', v2] represents that a constant 'y' is read into v2 (e.g., constant[c, v2] represents that a constant c is read to v2);
readPro[v1, v2, v3] represents that the property v2 of the object v1 is read into v3;
readVar['a', v4] represents that a variable 'a' is read into v4;
+[v3, v4, v5] represents that the sum of v3 and v4 is written into v5, and symbol + is a basic OP operational mode; and
Ret[v5] represents returning to v5.

After having divided the software program 2 into a plurality of basic blocks (including a plurality of first basic blocks and a second basic block), the processing device 13 may perform a variable type analysis on each of the basic blocks to solve the dynamic type properties of the dynamic language. More specifically, the processing device 13 may calculate a first variable type output corresponding to an unknown variable for each of the first basic blocks. The processing device 13 may calculate a second variable type input corresponding to the unknown variable for the second basic block according to the first variable type outputs. The processing device 13 may calculate a second variable type generation corresponding to the unknown variable for the second basic block when the second basic block comprises a primitive instruction corresponding to the unknown variable. The processing device 13 may calculate a second variable type kill corresponding to the unknown variable for the second basic block. The processing device 13 may calculate a second variable type output corresponding to the unknown variable for the second basic block according to the second variable type input, the second variable type generation and the second variable type kill. The storage device 15 may store the first variable type output and the second variable type output.

Figure 3:
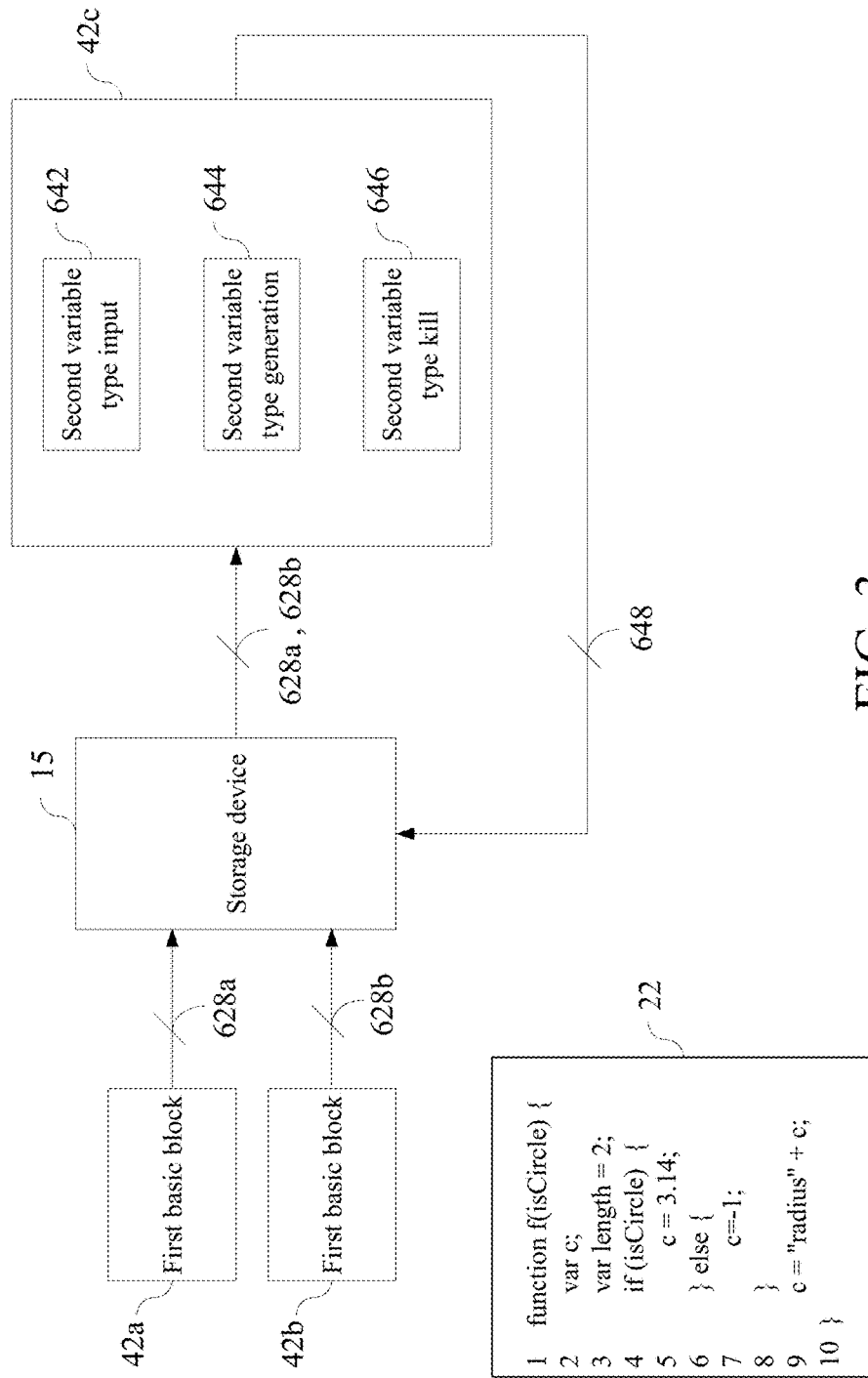
FIG. 3 is a schematic operational view of a variable inference system according to an embodiment of the present invention.

FIG. 3 is a schematic operational view of the variable reference system 1. In FIG. 3, for example, the software program 2 is a JavaScript language program 22, and the processing device 13 may traverse three block nodes in the abstract syntax tree (not shown) of the JavaScript language program 22 and sequentially establish a first basic block 42a, a first basic block 42b and a second basic block 42c. More specifically, the primitive instruction of the first basic block 42a corresponds to ⌈c=3.14 ⌋ in the fifth row of the JavaScript language program 22, the primitive instruction of the first basic block 42b corresponds to ⌈c=−1 ⌋ in the seventh row of the JavaScript language program 22, and the primitive instruction of the second basic block 42c corresponds to ⌈c="radius"+c⌋ in the ninth row of the JavaScript language program 22.

As shown in FIG. 3, the processing device 13 can learn from ⌈var c⌋ in the second row of the JavaScript language program 22 that the JavaScript language program 22 has declared an unknown variable "c". However, the processing device 13 can not know the type of unknown variable "c" before analyzing the first basic block 42a. The processing device 13 may calculate a first variable type output 628a corresponding to the unknown variable "c" for the first basic block 42a. Specifically, the processing device 13 determines that the type of unknown variable "c" is the "double precision" according to ⌈c=3.14 ⌋ in the fifth row of the JavaScript language program 22, and then transmits the type (i.e., the "double precision") of the unknown variable c to the storage device 15 via the first variable type output 628a.

On the other hand, the processing device 13 can infer from ⌈var length=2 ⌋ in the third row of the JavaScript language program 22 that the JavaScript language program 22 has also declared a variable "length", and it has been known that the type thereof is an integer without a sign (Uint). Furthermore, according to ⌈c=3.14 ⌋ in the fifth row of the JavaScript language program 22, the processing device 13 may determine that the primitive instruction in the first basic block 42a does not additionally define or alter the type of variable "length". Then, the processing device 13 may also transmit the type (i.e., Uint) of the variable "length" to the storage device 15 via the first variable type output 628a.

The processing device 13 may further calculate a first variable type output 628b corresponding to unknown variable "c" for the first basic block 42b. Specifically, the processing device 13 determines that the type of unknown variable "c" is an integer (Int) according to ⌈c=−1⌋ in the seventh row of the JavaScript language program 22, and then transmits the type (i.e., Int) of unknown variable "c" to the storage device 15 via the first variable type output 628b. Additionally, the processing device 13 may determine that the primitive instruction in the first basic block 42b does not additionally define or alter the type of variable "length" according to ⌈c=−1 ⌋ in the seventh row of the JavaScript language program 22. Therefore, the processing device 13 may similarly transmit the type (i.e., Uint) of variable "length" to the storage device 15 via the first variable type output 628b.

When analyzing the second basic block 42c, the processing device 13 may obtain the first variable type output 628a of the first basic block 42a and the first variable type output 628b of the first basic block 42b from the storage device 15. In other embodiments, when analyzing the second basic block 42c, the processing device 13 may also directly receive the first variable type output 628a from the first basic block 42a and receive the first variable type output 628b from the first basic block 42b. Then, the processing device 13 may calculate a second variable type input 642 corresponding to unknown variable "c" for the second basic block 42c according to the first variable type output 628a and the first variable type output 628b.

In this embodiment, the processing device 13 may calculate the second variable type input 642 corresponding to unknown variable "c" according to the following equation:

$$\text{TYPE}_{in}(n_i) = T\_\text{MERGE}(\text{TYPE}_{out}(n_j), \text{TYPE}_{out1}(n_k)) \\ \forall n_j, n_k \in \text{Pred}(n_i) \quad (1)$$

where, $\text{TYPE}_{in}(n_i)$ represents the second variable type input 642, $n_i$ represents a current basic block (e.g., the second basic block 42c shown in FIG. 3), $\text{Pred}(n_i)$ represents basic blocks (e.g., the first basic block 42a and the first basic block 42b shown in FIG. 3), previous to the current basic block, $n_j$ and $n_k$ represent any two of the basic blocks previous to the current basic block, and T_MERGE(*) represents a type fusion operation.

$\text{TYPE}_{in}(n_i)$ may be considered to define a set of type pairs TYPEPAIRs. The set of type pairs incorporates all type pairs with the same variable names x and y in the basic blocks previous to the current basic block. If $n_k$ belongs to a call, then Pred($n_i$) represents $n_k$ as the new node and $n_i$ as the first node. If $n_k$ does not belong to a call, then Pred ($n_i$) represents all basic blocks previous to $n_i$.

More specifically, $TYPE_{in}$ firstly defines how type elements fuse with each other through a t_merge function, and then describes the generation of a type pair through the t_merge function. A union of all type pairs that are generated is a set of type pairs. The t_merge function is a basic component unit of Pred($n_i$), and is defined as follows:

$$\text{t\_merge}(ta, tb) = \begin{cases} \{\text{LATTICE}(ta, tb)\} & \text{if } ta, tb \in numbe \\ \{ta, tb\} & \text{if } (ta \neq tb) \wedge (ta, tb \in \text{number}) \\ \{ta (\text{or } tb)\} & \text{if } (ta = tb) \wedge (ta, tb \in \text{number}) \end{cases} \quad (2)$$

$$ta \in TYPESET(a)$$
$$tb \in TYPESET(b)$$
$$TYPEPAIR(a) \subseteq TYPE_{out}(n_j)$$
$$TYPEPAIR(b) \subseteq TYPE_{out}(n_k)$$

where, ta and tb each represents a single type element, TYPESET (a) and TYPESET (b) represent a type set of variable "a" and a type set of variable "b" respectively.

As shown in Equation (2), if ta and tb are both a number, then t_merge(ta, tb)={LATTICE (ta, tb)}. {LATTICE (ta, tb)} is a kind of structure commonly used when determining a meet operation in a data-flow analysis. The content of the lattice structure varies with the information obtained through a user's analysis. The lattice structure is used for numbers in this embodiment.

Figure 4:
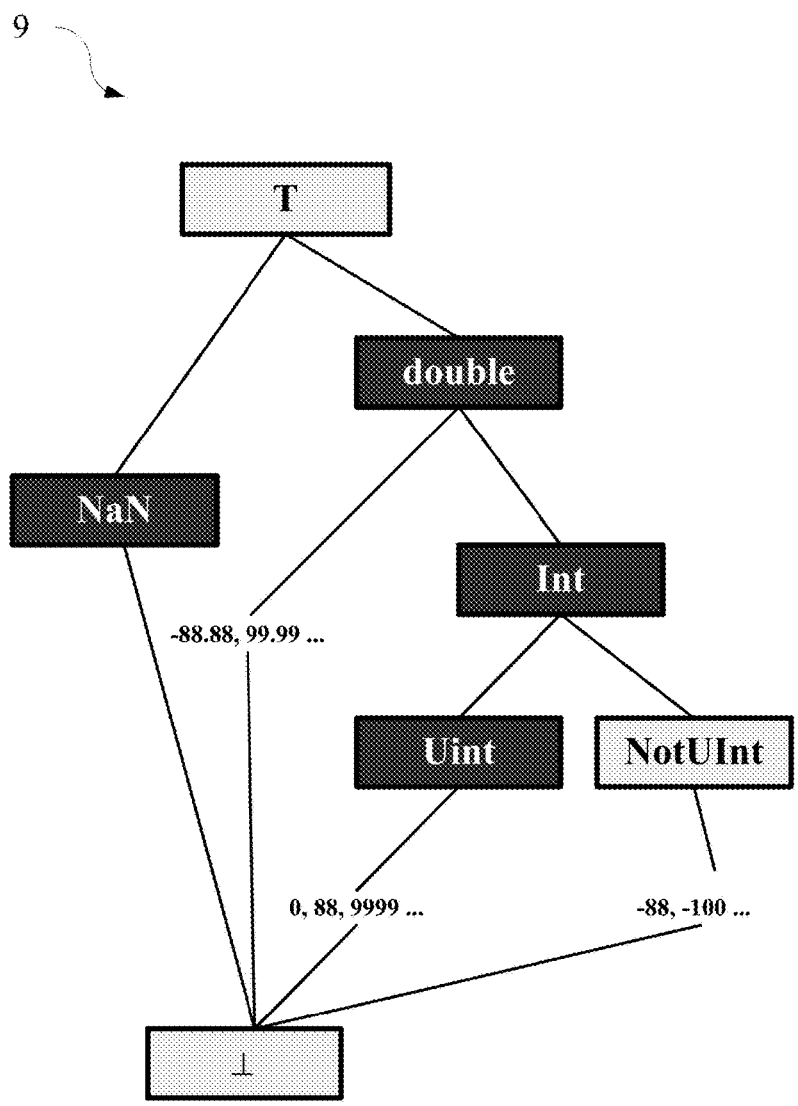
FIG. 4 is a schematic view illustrating a lattice structure according to an embodiment of the present invention.

FIG. 4 is a schematic view illustrating a lattice structure 9 according to an embodiment of the present invention. As shown in FIG. 4, T is called the "top", which represents such a type set as numbers. ⊥ is called the "bottom", which represents an empty set. Constant numbers such as 0, 100, −100 . . . and etc. form a singleton set. The Uint, the Int, and the double precision are types to be determined.

{LATTICE (ta, tb)} shown in Equation (2) represents that an operation with respect to ta and tb will be calculated according to the lattice structure 9 shown in FIG. 4 to find the greatest lower bound. For example, assuming that ta is a Uint and tb is an integer, then, the greatest lower bound is the integer according to the lattice structure 9 shown in FIG. 4. In other words, to find the greatest lower bound means finding a type that can encompass both types of ta and tb at the same time.

Furthermore, as shown in Equation (2), if ta and tb are not equal to each other and neither belong to numbers, then ta and tb will both be kept. If ta and tb are equal to each other and neither belong to numbers, then either ta or tb will be kept.

TYPEPAIR (a) refers to a union of all t_merge(ta, tb) of variable "a", and is defined as follows:

$$TYPEPAIR(a) = \left\{ < a : \bigcup \text{t\_merge}(ta, tb) \right\} \quad (3)$$
$$\forall \text{ variable } a$$
$$\forall ta \in TYPESET(a)$$
$$\forall tb \in TYPESET(b)$$
$$\forall TYPEPAIR(a) \subseteq TYPE_{out}(n_j)$$
$$\forall TYPEPAIR(b) \subseteq TYPE_{out}(n_k)$$

According to Equations (2) and (3), T_MERGE($TYPE_{out}$ ($n_j$), $TYPE_{out}$($n_k$)) described in Equation (1) may be represented as follows:

$$T\_MERGE(TYPE_{out}(n_j), \quad (4)$$
$$TYPE_{out1}(n_k)) = \bigcup TYPEPAIR(a)$$
$$= \bigcup \left\{ < a : \bigcup \text{t\_merge}(ta, tb) \right\}$$
$$\forall \text{ variable } a$$
$$\forall ta \in TYPESET(a)$$
$$\forall tb \in TYPESET(b)$$
$$\forall TYPEPAIR(a) \subseteq TYPE_{out}(n_j)$$
$$\forall TYPEPAIR(b) \subseteq TYPE_{out}(n_k)$$

The processing device 13 may infer from the first variable type output 628a and the first variable type output 628b that the type of unknown variable "c" encompasses the double precision and the integer, and the type of variable "length" is a Uint. Because the type of unknown variable "c" encompasses the double precision and the integer, the processing device 13 may determine that the type of unknown variable "c" is the double precision according to Equation (1) and the lattice structure 9 shown in FIG. 4. Then, the processing device 13 calculates the second variable type input 642 corresponding to the unknown variable "c". In this case, the information of the second variable type input 642 comprises that the type of unknown variable "c" is the double precision and the type of variable "length" is a Uint.

The processing device 13 determines that the primitive instruction corresponding to the unknown variable "c" comprised in the second basic block 42c is ⌈+[c, "radius", c]⌋ according to ⌈c="radius"+c⌋ in the ninth row of the JavaScript language program 22. Then, the processing device 13 may calculate a second variable type generation 644 corresponding to the unknown variable "c" for the second basic block 42c. Specifically, the primitive instruction ⌈+[c, "radius", c]⌋ of the unknown variable "c" comprises two source operands, a destination operand and an operation. The source operands refer to variable "c" and string "radius" respectively. The destination operand refers to the variable "c" after the operation, and the operation refers to an add operation. The processing device 13 may calculate a second variable type generation 644 corresponding to the unknown variable "c" according to the source operands, the destination operand and the operation.

For example, the processing device 13 may calculate a second variable type generation 644 corresponding to unknown variable "c" for the second basic block 42c according to the following equation:

$$TYPE_{gen}(n_i) = \left\{ < d : \bigcup \text{t\_generate}(OP, ta, tb) \right\} \quad (5)$$
$$\forall ta \in TYPESET(s1)$$
$$\forall tb \in TYPESET(s2)$$

where, d represents a destination operand of a primitive instruction, s1 and s2 represent source operands of the primitive instruction respectively, OP represents an operation of the primitive instruction, ta and tb each represent a single type element, TYPESET(s1) and TYPESET (s2) represent a type set of s1 and a type set of s2 respectively.

TYPE$_{gen}$ may be considered to define a set. The set comprises an exclusive type pair of the name of a destination operand of a primitive instruction, and a type set comprising a union of all t_generate (OP, ta, tb) and the type pair of the destination operand.

The definition of t_generate (OP, ta, tb) may change depending on the syntax of the software program 2. For example, if the software program 2 is a JavaScript language program, then t_generate (OP, ta, tb) may be defined according to the syntax of the JavaScript language program itself. If the software program 2 is a Java language program, then t_generate (OP, ta, tb) may be defined according to the syntax of the Java language program itself.

In the case where the software program 2 is a JavaScript language program, the definition of t_generate (OP, ta, tb) may be as follows:

$$\text{t\_generate}(OP, ta, tb) = \begin{cases} \{\text{boolean}\} & \text{if } OP \in \text{comparison} \\ \{ta\} & \text{if } (ta = \text{function}) \wedge (tb = \text{null}), \text{ where } ta \text{ is denoted as} \\ & \{(type1 \times type2 \times \ldots \times typeN) \rightarrow \text{type}\} \\ \{ta\} & \text{if } (ta = \text{object}) \wedge (tb = \text{null}), \text{ where } ta \text{ is denoted as} \\ & \{\text{constructor}[type1[type2[\ldots typeN]]]\} \\ \{\text{LATTICE}(ta, tb)\} & \text{if } (ta, tb \in \text{number}) \wedge OP \notin \text{comparison} \\ \{ta(\text{or } tb)\} & \text{if } (ta = tb \wedge (ta, tb \in \text{number})) \\ \{\text{number}\} & \text{if } (ta \in \text{number} \wedge tb \in \text{boolean} \wedge OP \notin \text{comparison}) \vee \\ & ((ta \in \text{number}|\text{boolean}) \wedge (tb \in \text{string}) \wedge (OP = -|*|/|\text{bitwise}|)) \\ \{\text{string}\} & \text{if } (ta \in \text{number}|\text{boolean}) \wedge (tb \in \text{string}) \wedge (OP = +) \end{cases} \quad (6)$$

As described above, the processing device 13 determines that the primitive instruction corresponding to unknown variable "c" is ⌈+[c, "radius", c]⌋ according to ⌈c="radius"+c⌋ in the ninth row of the JavaScript language program 22. The source operands are variable "c" and string "radius" respectively. The destination operand is variable "c" after the operation, and the operation is an add operation. Therefore, according to Equation (6), the processing device 13 may generate a variable type (i.e., a string) for unknown variable "c", and then generate the second variable type generation 644 corresponding to unknown variable "c".

After having obtained the second variable type input 642 and the second variable type generation 644 through calculation, the processing device 13 may optionally calculate a second variable type kill 646 corresponding to unknown variable "c" for the second basic block 42c. Finally, the processing device 13 may calculate a second variable type output 648 corresponding to unknown variable "c" for the second basic block 42c according to the second variable type input 642, the second variable type generation 644 and the second variable type kill 646, and then store the second variable type output 648 into the storage device 15.

For example, the processing device 13 may calculate the second variable type output 648 corresponding to unknown variable "c" according to the following equation:

$$\text{TYPE}_{out}(n_i) = \text{TYPE}_{gen}(n_i) \cup (\text{TYPE}_{in}(n_i) - \text{TYPE}_{kill}(n_i)) \quad (7)$$

where, $n_i$ represents the second basic block 42c, ∪ represents a union operation, and TYPE$_{out}$ ($n_i$), TYPE$_{gen}$ ($n_i$), TYPE$_{in}$ ($n_i$) and TYPE$_{kill}$ ($n_i$) represent the second variable value output 648, the second variable value generation 644, the second variable value input 642 and the second variable value kill 646 respectively.

The second variable type kill 646 may be configured to kill the extra second variable type input 642. For example, if an unknown variable is re-defined in a second basic block, then the second variable type input that is previously inputted is killed. In other embodiments, if the processing returns to a basic block (e.g., the first block 42a) according to a primitive instruction during the process of processing a current function scope, then the second variable type kill may be defined as all variable type data in this scope of a set of basic blocks (e.g., the first block 42c) that follow the basic block.

For example, in the JavaScript language program 22 shown in FIG. 3, because the ninth row of the JavaScript language program 22 where unknown variable "c" is re-defined (i.e., the variable type is re-defined as a string), the second variable type kill 646 is equal to the second variable type input 642. In other words, the processing device 13 kills the second variable type input 642 according to the second variable type kill 646. In this case, according to Equation (7), the information of the second variable type output 648 comprises a string as the type of unknown variable "c" and a Uint as the type of variable "length." Therefore, the processing device 13 can infer through a variable type analysis that the type of unknown variable "c" is a string and the type of variable "length" is a Uint.

The processing device 13 may effectively process a primitive type through the aforesaid variable type analysis. However the processing device 13 can not process an object type according to only the type information in case of an object property access. Therefore, to know the property name, the content comprised in the actual variable must also be analyzed in addition to analyzing the type of the variable. In view of this, this embodiment may also analyze the value of the variable to obtain the value of the variable in each of the basic blocks.

To obtain the content comprised in the actual variable through analysis, the processing device 13 may also perform a variable value analysis on each of the basic blocks to solve the dynamic name binding property of the dynamic language after the software program 2 has been divided into a plurality of basic blocks (including a plurality of first basic blocks and a second basic block). More specifically, the processing device 13 may calculate a first variable value output corresponding to an unknown variable for each of the first basic blocks. The processing device 13 may calculate a second variable value input corresponding to the unknown variable for the second basic block according to the first variable value outputs. The processing device 13 may calculate a second variable value generation corresponding to the unknown variable for the second basic block when the second basic block comprises a primitive instruction corresponding to the unknown variable. The processing device 13 may calculate a second variable value kill corresponding to the unknown variable for the second basic block. The processing device 13 may calculate a second variable value output corresponding to the unknown variable for the second basic block according to the second variable value input, the second variable value generation, and the second variable value kill. The storage device 15 may store the first variable value outputs and the second variable value output. The processing device 13 may perform the aforesaid variable type analysis and the variable value analysis on each of the basic blocks in sequence or in parallel.

Figure 5:
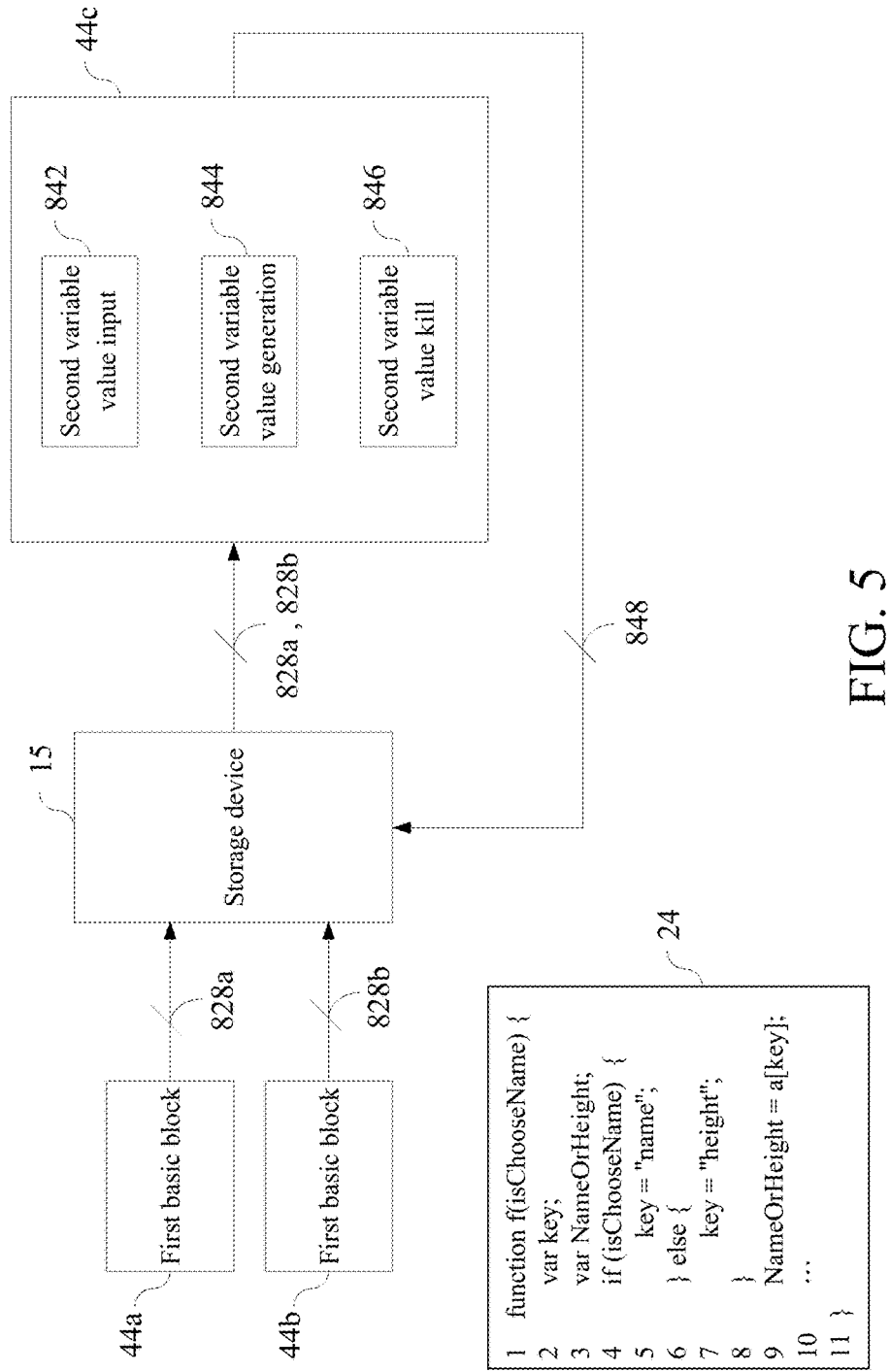
FIG. 5 is another schematic operational view of a variable inference system according to an embodiment of the present invention.

FIG. 5 is another schematic operational view of the variable inference system 1. For example, in FIG. 5, the software program 2 is a JavaScript language program 24, and the processing device 13 may traverse three block nodes in the abstract syntax tree (not shown) of the JavaScript language program 24, and sequentially establish a first basic block 44a, a first basic block 44b and a second basic block 44c. More specifically, a primitive instruction of the first basic block 44a corresponds to [key="name" ] in the fifth row of the JavaScript language program 24; a primitive instruction of the first basic block 44b corresponds to [key="height" ] in the seventh row of the JavaScript language program 24; and a primitive instruction of the second basic block 44c corresponds to [NameOrHeight=a[key]] in the ninth row of the JavaScript language program 24.

As shown in FIG. 5, the processing device 13 may infer from [var key ] in the second row and [var NameOrHeight] in the third row of the JavaScript language program 24 that the JavaScript language program 24 has declared an unknown variable "key" and an unknown variable "NameOrHeight". However, before analyzing the first basic block 44a, the processing device 13 can not know the value of unknown variable "key". The processing device 13 may calculate a first variable value output 828a corresponding to unknown variable "key" for the first basic block 44a. In detail, the processing device 13 may determine that the value of unknown variable "key" is string "name" according to [key="name" ] in the fifth row of the JavaScript language program 24, and then transmit the value (i.e., string "name") of unknown variable "key" to the storage device 15 via the first variable value output 828a.

The processing device 13 may further calculate a first variable value output 828b corresponding to unknown variable "key" for the first basic block 44b. Specifically, the processing device 13 may determine that the value of unknown variable "key" is string "height" according to [key="height"] in the seventh row of the JavaScript language program 24, and then transmit the value (i.e., string "height") of unknown variable "key" to the storage device 15 via the first variable value output 828b.

The processing device 13 may calculate a second variable value output 848 corresponding to unknown variable "key" and unknown variable "NameOrHeight" for the second basic block 44c according to the second variable value input 842, the second variable value generation 844 and the second variable value kill 846, and then store the second variable value output 848 into the storage device 15.

For example, the processing device 13 may calculate the second variable value output 848 corresponding to unknown variable "key" and unknown variable "NameOrHeight" according to the following equation:

$$\text{VALUE}_{out}(n_i) = \text{VALUE}_{gen}(n_i) \cup (\text{VALUE}_{in}(n_i) - \text{VALUE}_{kill}(n_i)) \quad (8)$$

where, $n_i$ represents the second basic block 44c, $\cup$ represents a union operation, and $\text{VALUE}_{out}(n_i)$, $\text{VALUE}_{gen}(n_i)$, $\text{VALUE}_{in}(n_i)$ and $\text{VALUE}_{kill}(n_i)$ represent the second variable value output 848, the second variable value generation 844, the second variable value input 842 and the second variable value kill 846 respectively.

The second variable value kill 846 may be configured to kill the extra second variable value input 842. For example, if an unknown variable is re-defined in a second basic block, then the second variable value input previously inputted will be killed. In other embodiments, if the processing returns to a basic block (e.g., the first block 44a) according to a primitive instruction during the process of processing a current function scope, then the second variable type kill may be defined as all variable value data in this scope of a set of basic blocks (e.g., the first block 44c) that follow the basic block.

When analyzing the second basic block 44c, the processing device 13 may obtain the first variable value output 828a of the first basic block 44a and the first variable value output 828b of the first basic block 44b from the storage device 15. In other embodiments, when analyzing the second basic block 44c, the processing device 13 may also directly receive the first variable value output 828a from the first basic block 44a and receive the first variable value output 828b from the first basic block 44b. Then, the processing device 13 may calculate a second variable value input 842 corresponding to unknown variable "key" for the second basic block 44c according to the first variable value output 828a and the first variable value output 828b.

In this embodiment, the processing device 13 may calculate the second variable value input 842 corresponding to unknown variable "key" according to the following equation:

$$\text{VALUE}_{in}(n_i) = V\_\text{MERGE}(\text{VALUE}_{out}(n_j), \text{VALUE}_{out}(n_k)) \forall n_j, n_k \in \text{Pred}(n_i) \quad (9)$$

where, $\text{VALUE}_{in}(n_i)$ represents the second variable value input 842, $n_i$ represents the current basic block (e.g., the second basic block 44c shown in FIG. 5), $\text{Pred}(n_i)$ represents basic blocks (e.g., the first basic block 44a and the first basic block 44b shown in FIG. 5) previous to the current basic block, $n_j$ and $n_k$ represent any two of the basic blocks previous to the current basic block, and $V\_\text{MERGE}(*)$ represents a value fusion operation.

$\text{VALUE}_{in}$ may be considered to define a set of value pairs (VALUEPAIRs), and the set of value pairs incorporates all value pairs that have the same variable names x and y from the basic blocks previous to the current basic block. If $\text{VALUE}_{in}$ belongs to a call, then $\text{Pred}(n_i)$ represents $n_k$ as a new node and $n_j$ as the first node. If $n_k$ does not belong to a call, then $\text{Pred}(n_i)$ represents all basic blocks previous to $n_i$.

More specifically, $\text{VALUE}_{in}$ firstly defines how value elements fuse with each other through a v_merge function, and then describes the generation of a value pair through the t_merge function, and a union of all value pairs that are generated is just a set of value pairs. The t_merge function is a basic component unit of $V\_\text{MERGE}(*)$, and is defined as follows:

$$v\_\text{merge}(va, vb) = \bigcup (\{va\}, \{vb\}) \quad (10)$$

$\forall\, va \in VALUESET(a)$ $\forall\, va \in VALUESET(b)$ $\forall\, VALUEPAIR(a) \subseteq VALUE_{out}(n_j)$ $\forall\, VALUEPAIR(b) \subseteq VALUE_{out}(n_k)$ where, va and vb each represents a single value element, and VALUESET(a) and VALUESET (b) represent a value set of variable "a" and a value set of variable "b" respectively.

VALUEPAIR(a) refers to a union of all v_merge (va, vb) of variable "a", and is defined as follows:

$$VALUEPAIR(a) = \{ < a : \bigcup v\_merge(va, vb) \} \quad (11)$$

$$\forall\, va \in VALUESET(a)$$
$$\forall\, vb \in VALUESET(b)$$
$$\forall\, VALUEPAIR(a) \subseteq VALUE_{out}(n_j)$$
$$\forall\, VALUEPAIR(b) \subseteq VALUE_{out}(n_k)$$

According to Equations (10) and (11), V_MERGE(VALUE$_{out}$(n$_j$), VALUE$_{out1}$(n$_k$)) described in the equation (9) may be represented as follows:

$$V\_MERGE(VALUE_{out}(n_j), \quad (12)$$

$$VALUE_{out1}(n_k)) = \bigcup VALUEPAIR(a)$$
$$= \bigcup \{ < a(\text{or } b) : \bigcup v\_merge(va, vb) \}$$
$$\forall\, \text{variable } a \text{ in } VALUE_{out}(n_j)$$
$$\forall\, \text{variable } b \text{ in } VALUE_{out}(n_k)$$
$$\forall\, va \in VALUESET(a)$$
$$\forall\, vb \in VALUESET(b)$$
$$\forall\, VALUEPAIR(a) \subseteq VALUE_{out}(n_j)$$
$$\forall\, VALUEPAIR(b) \subseteq VALUE_{out}(n_k)$$

The processing device 13 may know that the value of unknown variable "key" comprises string "name" and string "height" according to the first variable value input 828a and the first variable value input 828b. According to Equation (8), the processing device 13 may determine that the value of unknown variable "key" is a set comprising string "name" and string "height". Then, the processing device 13 may calculate the second variable value input 842 corresponding to unknown variable "key". In this case, the information of the second variable value input 842 comprises that the value of unknown variable "key" comprises string "name" and string "height."

According to [NameOrHeight=a[key]] in the ninth row of the JavaScript language program 24, the processing device 13 can determine that the primitive instruction thereof is [readPro[a, key, v1]]. That is, attribute "key" of variable "a" is read into v1. The processing device 13 can determine from the primitive instruction [readPro[a, key, v1]] that the value of unknown variable "key" are not re-defined or altered, so it is unnecessary to calculate the second variable value generation 844 corresponding to unknown variable "key" for the second basic block 44c. The second variable value kill 846 is an empty set (i.e., it is unnecessary to kill any second variable value input 842) because no alteration has occurred. Therefore, according to Equation (8), the processing device 13 may calculate the second variable value output 848 corresponding to unknown variable "key" for the second basic block 44c, and then store the second variable value output 848 into the storage device 15. For unknown variable "key", the second variable value output 848 is the second variable value input 842. That is, the value of unknown variable "key" comprises string "name" and string "height".

As described above, according to [NameOrHeight=a[key]] in the ninth row of the JavaScript language program 24, the processing device 13 may determine that the primitive instruction thereof is [readPro[a, key, v1]]. That is, attribute "key" of variable "a" is read into v1. Then, the processing device 13 may calculate the second variable value generation 844 corresponding to unknown variable "NameOrHeight" for the second basic block 44c. Specifically, the primitive instruction [readPro[a, key, v]] of unknown variable "NameOrHeight" comprises two source operands, a destination operand and an operation. The source operands refer to "a" and "key" respectively, the destination operand refers to "v1", and the operation refers to an operation of reading an attribute. The processing device 13 may calculate the second variable value generation 844 corresponding to unknown variable "NameOrHeight" according to the source operands, the destination operand and the operation.

For example, the processing device 13 may calculate the second variable value generation 844 corresponding to unknown variable "NameOrHeight" for the second basic block 44c according to the following equation:

$$VALUE_{gen}(n_i) = \{ < d : \bigcup v\_generate(OP, va, vb) \} \quad (13)$$

$$\forall\, va \in VALUESET(s1)$$
$$\forall\, vb \in VALUESET(s2)$$

where, "d" refers to a destination operand of a primitive instruction, "s1" and "s2" each represents a source operand of the primitive instruction, "OP" represents an operation of the primitive instruction, va and vb each represents a single value element, and VALUESET(s1) and VALUESET(s2) represent a value set of s1 and a value set of s2 respectively. If va, vb∉constant, then v_generate(OP, va, vb)={va OP vb}.

Assume that the processing device 13 has known a[key=name]="sslab" and a[key=height]=175 according to the previous analysis result or the content stored in the storage device 15. Then, the processing device 13 may calculate the second variable value generation 844 corresponding to unknown variable "NameOrHeight" according to Equation (13). In this case, the information of the second variable value generation 844 comprises that the value of unknown variable "NameOrHeight" comprises string "sslab" and number "175". Because unknown variable "NameOrHeight" does not have the second variable value input 842, the second variable value kill 846 thereof is an empty set (i.e., it is unnecessary to kill any second variable value input 842). Finally, according to Equation (8), the processing device 13 can calculate the second variable value output 848 corresponding to unknown variable "NameOrHeight" for the second basic block 44c, and then store the second variable value output 848 into the storage device 15. For unknown variable "NameOrHeight", the second variable value output 848 is the second variable value generation 844. That is, the value of unknown variable "NameOrHeight" comprises string "sslab" and number "175."

Through the aforesaid variable value analysis, the processing device 13 can infer that the value of unknown variable "key" comprises string "name" and string "height", and the value of unknown variable "NameOrHeight" comprises string "sslab" and the number "175". [NameOrHeight=a[key]] in the ninth row of the JavaScript language program 24 belongs to the dynamic name binding property of dynamic languages. However, through the aforesaid variable value analysis, the processing device 13 has effectively solved the problem caused by the dynamic name binding of the dynamic language.

In other embodiments, the processing device 13 may firstly perform a constant propagation to record the value information of a constant before performing the aforesaid variable value analysis. Through the constant propagation, the computation time of the constant can be reduced when the processing device 13 performs the aforesaid variable value analysis. The method in which the constant propagation is performed can be readily known by those of ordinary skill in the art of the present invention, and thus, this will not be further described herein.

Figure 6:
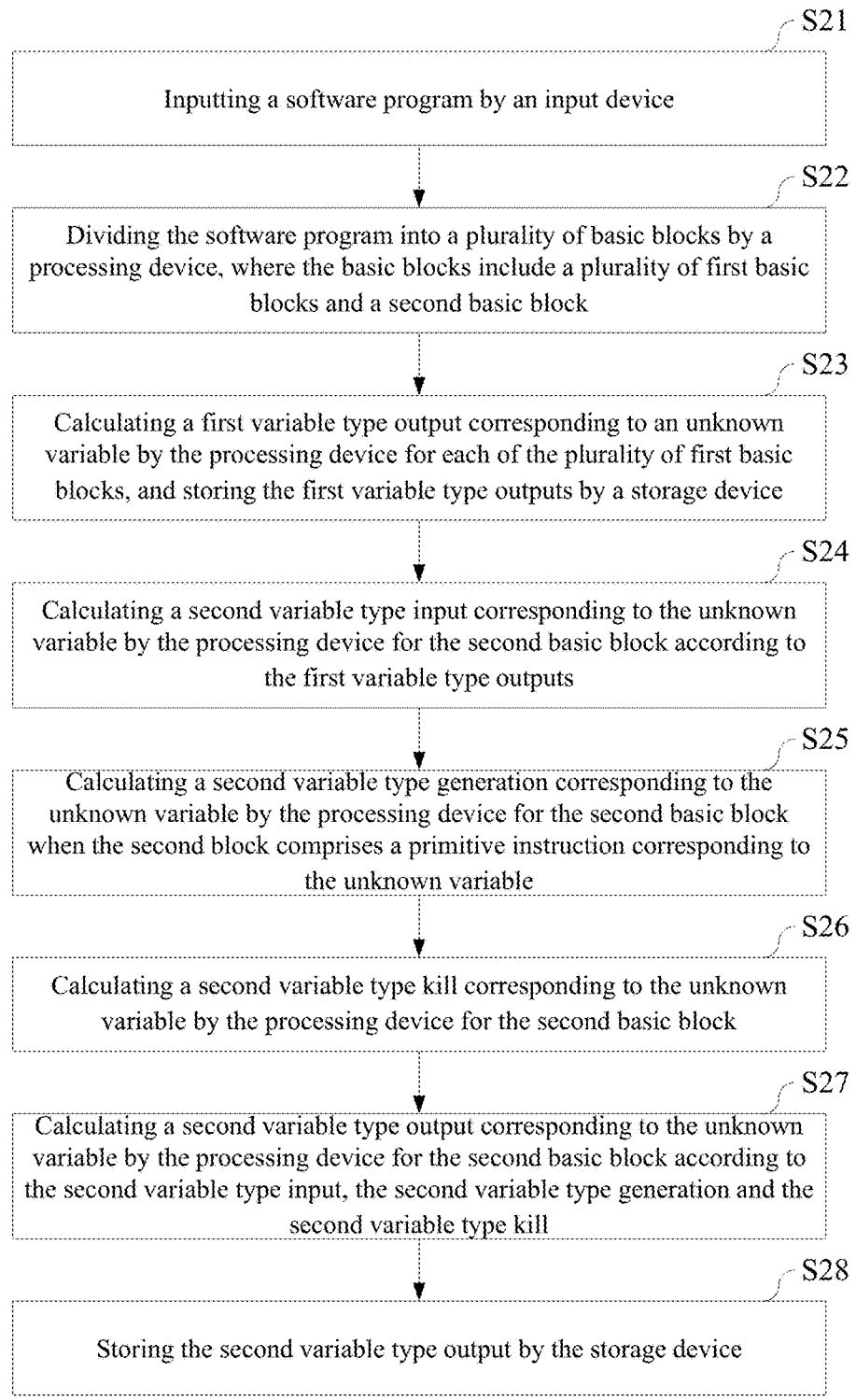
FIG. 6 is a schematic view illustrating a variable inference method according to an embodiment of the present invention.

Another embodiment of the present invention (briefly called "a second embodiment") is a variable inference method for a software program. FIG. 6 is a schematic view illustrating the variable inference method. As shown in FIG. 6, the variable inference method comprises the following steps: a step S21 of inputting a software program by an input device; a step S22 of dividing the software program into a plurality of basic blocks by a processing device, where the basic blocks include a plurality of first basic blocks and a second basic block; a step S23 of calculating a first variable type output corresponding to an unknown variable by the processing device for each of the plurality of first basic blocks and storing the first variable type outputs by a storage device; a step S24 of calculating a second variable type input corresponding to the unknown variable by the processing device for the second basic block according to the first variable type outputs; a step S25 of calculating a second variable type generation corresponding to the unknown variable by the processing device for the second basic block when the second basic block comprises a primitive instruction corresponding to the unknown variable; a step S26 of calculating a second variable type kill corresponding to the unknown variable by the processing device for the second basic block; a step S27 of calculating a second variable type output corresponding to the unknown variable by the processing device for the second basic block according to the second variable type input, the second variable type generation and the second variable type kill; and a step S28 of storing the second variable type output by the storage device.

The input device, the processing device and the storage device as described in the steps S21~S28 may substantially correspond to the input device 11, the processing device 13 and the storage device 15 of the aforesaid embodiments respectively. In addition, the order in which the steps S21~S28 are presented is not intended to limit the present invention, and can be adjusted appropriately without departing from the spirits of the present invention.

In an exemplary example of this embodiment, the processing device may calculate the second variable type input corresponding to the unknown variable according to Equation (1).

In an exemplary example of this embodiment, the primitive instruction may comprise two source operands, a destination operand and an operation, and the processing device may calculate the second variable type generation corresponding to the unknown variable according to the source operands, the destination operand and the operation.

In an exemplary example of this embodiment, the processing device may calculate the second variable type output corresponding to the unknown variable according to Equation (7).

In an exemplary example of this embodiment, the processing device may calculate the second variable type output corresponding to the unknown variable according to Equation (7). Furthermore, if the unknown variable is re-defined in the second basic block, then the processing device kills the second variable type input previously inputted according to the second variable type kill.

In an exemplary example of this embodiment, the variable inference method may be used to perform a variable value analysis, and further comprises the following steps:

calculating a first variable value output corresponding to an unknown variable by the processing device for each of the first basic blocks and storing the first variable value outputs by the storage device;

calculating a second variable value input corresponding to the unknown variable by the processing device for the second basic block according to the first variable value outputs;

calculating a second variable value generation corresponding to the unknown variable by the processing device for the second basic block when the second basic block comprises a primitive instruction corresponding to the unknown variable;

calculating a second variable value kill corresponding to the unknown variable by the processing device for the second basic block;

calculating a second variable value output corresponding to the unknown variable by the processing device for the second basic block according to the second variable value input, the second variable value generation and the second variable value kill; and storing the second variable value output by the storage device.

Optionally, when performing the aforesaid variable value analysis by using the variable inference method, the processing device may calculate the second variable value input corresponding to the unknown variable according to Equation (9).

Optionally, during the aforesaid variable value analysis performed by using the variable inference method, the primitive instruction may comprise two source operands, a destination operand and an operation. The processing device may calculate the second variable value generation corresponding to the unknown variable according to the source operands, the destination operand and the operation.

Optionally, when performing the above variable value analysis by using the variable reference method, the processing device may calculate the second variable value output corresponding to the unknown variable according to Equation (8).

Optionally, when performing the aforesaid variable value analysis by using the variable inference method, the processing device may calculate the second variable value output corresponding to the unknown variable according to Equation (8). Furthermore, if the unknown variable is re-defined in the second basic block, then the processing device kills the second variable value input previously inputted according to the second variable value kill.

The variable inference method substantially comprises steps corresponding to all the operations of the variable inference system 1 in the first embodiment. Those of ordinary skill in the art of the present invention can readily understand the corresponding steps that are not described in the second embodiment according to the related disclosure of the previous embodiment, and thus this will not be further described herein.

According to the above descriptions, the present invention provides a variable inference system and a variable inference method for a software program. The variable inference system and the variable inference method may divide the software program into a plurality of basic blocks, and calculate a variable type input (i.e., variable types inputted into a current basic block), a variable type generation (i.e., variable types generated by the current basic block itself), a variable type kill (i.e., variable types to be killed by the current basic block), and a variable type output (i.e., variable types to be outputted from the current basic block to other basic blocks) for each of the basic blocks. More specifically, the variable inference system and the variable inference method may calculate the variable type input of the current basic block according to the variable type outputs that are calculated for previous basic blocks. The variable inference system and the variable inference method may, according to a primitive instruction in the current basic block, calculate the variable type generation thereof. The variable inference system and the variable inference method may optionally calculate the variable type kill for the current basic block. For each of the basic blocks, the variable inference system and the variable inference method may calculate the variable type output thereof according to the variable type input, the variable type generation and the variable type kill thereof and then store the variable type outputs.

Through the aforesaid operations, variable types of a related unknown variable in the previous basic blocks may directly flow into the current basic block in the form of a data flow, or may be stored into a storage device (e.g., a database). Then, when a variable type of the unknown variable in the current basic block is to be obtained, the present invention may obtain the variable types of the related unknown variable from the previous basic blocks or the storage device, and then infer what the variable type of the unknown variable is in the current basic block. Therefore, even if a certain basic block comprises the dynamic type properties (e.g., the dynamic typing and the dynamic name binding) of dynamic languages, the present invention may still effectively infer the variable type of the unknown variable according to the variable type information of the unknown variable in the previous basic blocks.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A variable inference system for a software program, comprising:
an input device, being configured to input the software program;
a processor connected to the input device, being configured to divide the software program into a plurality of basic blocks comprising a plurality of first basic blocks and a second basic block, calculate a first variable type output corresponding to an unknown variable for each of the plurality of first basic blocks, calculate a second variable type input corresponding to the unknown variable for the second basic block according to the first variable type outputs, calculate a second variable type generation corresponding to the unknown variable for the second basic block when the second basic block comprises a primitive instruction corresponding to the unknown variable, calculate a second variable type kill corresponding to the unknown variable for the second basic block, and calculate a second variable type output corresponding to the unknown variable for the second basic block according to the second variable type input, the second variable type generation and the second variable type kill; and
a storage device connected to the processor, being configured to store the first variable type output and the second variable type output.

2. The variable inference system of claim 1, wherein the processor calculates the second variable type input corresponding to the unknown variable according to the following equation:

$$\text{TYPE}_{in}(n_i) = T\_\text{MERGE}(\text{TYPE}_{out}(n_j), \text{TYPE}_{out1}(n_k))$$
$$\forall n_j, n_k \in \text{Pred}(n_i)$$

where, $n_i$ represents the second basic block, $\text{Pred}(n_i)$ represents the first basic blocks, $n_j$ and $n_k$ represent any two of the first basic blocks, and $T\_\text{MERGE}(*)$ represents a type fusion operation.

3. The variable inference system of claim 1, wherein the primitive instruction comprises two source operands, a destination operand and an operation, and the processor calculates the second variable type generation corresponding to the unknown variable according to the source operands, the destination operand and the operation.

4. The variable inference system of claim 1, wherein the processing device calculates the second variable type output corresponding to the unknown variable according to the following equation:

$$\text{TYPE}_{out}(n_i) = \text{TYPE}_{gen}(n_i) \cup (\text{TYPE}_{in}(n_i) - \text{TYPE}_{kill}(n_i))$$

where, $n_i$ represents the second basic block, $\cup$ represents a union operation, $\text{TYPE}_{out}(n_i)$ $\text{TYPE}_{gen}(n_i)$, $\text{TYPE}_{in}(n_i)$ and $\text{TYPE}_{kill}(n_i)$ represent the second variable type output, the second variable type generation, the second variable type input and the second variable type kill respectively.

5. The variable inference system of claim 4, wherein if the unknown variable is re-defined in the second basic block, then the processor kills the second variable type input previously inputted according to the second variable type kill.

6. The variable inference system of claim 1, wherein the processor is further configured to calculate a first variable value output corresponding to an unknown variable for each of the first basic blocks, calculate a second variable value input corresponding to the unknown variable for the second basic block according to the first variable value outputs, calculate a second variable value generation corresponding to the unknown variable for the second basic block when the second basic block comprises a primitive instruction corresponding to the unknown variable, calculate a second variable value kill corresponding to the unknown variable for the second basic block, and calculate a second variable value output corresponding to the unknown variable for the second basic block according to the second variable value input, the second variable value generation and the second variable value kill; and wherein the storage device is further configured to store the first variable value output and the second variable value output.

7. The variable inference system of claim 6, wherein the processor calculates the second variable value input corresponding to the unknown variable according to the following equation:

$$\text{VALUE}_{in}(n_i) = V\_\text{MERGE}(\text{VALUE}_{out}(n_j), \text{VALUE}_{out1}(n_k)) \forall n_j, n_k \in \text{Pred}(n_i)$$

where, $n_i$ represents the second basic block, $\text{Pred}(n_i)$ represents the first basic blocks, $n_j$ and $n_k$ represent any two of the first basic blocks, and V_MERGE(*) represents a value fusion operation.

8. The variable inference system of claim 6, wherein the primitive instruction comprises two source operands, a destination operand and an operation, and the processor calculates the second variable value generation corresponding to the unknown variable according to the source operands, the destination operand and the operation.

9. The variable inference system of claim 6, wherein the processor calculates the second variable value output corresponding to the unknown variable according to the following equation:

$$\text{VALUE}_{out}(n_i)=\text{VALUE}_{gen}(n_i)\cup(\text{VALUE}_{in}(n_i)-\text{VALUE}_{kill}(n_i))$$

where, $n_i$ represents the second basic block, $\cup$ represents a union operation, and $\text{VALUE}_{out}(n_i)$, $\text{VALUE}_{gen}(n_i)$, $\text{VALUE}_{in}(n_i)$ and $\text{VALUE}_{kill}(n_i)$ represent the second variable value output, the second variable value generation, the second variable value input and the second variable value kill respectively.

10. The variable inference system of claim 9, wherein if the unknown variable is re-defined in the second basic block, then the processor kills the second variable value input previously inputted according to the second variable value kill.

11. A variable inference method for a software program, comprising:
inputting the software program by an input device;
dividing the software program into a plurality of basic blocks by a processing device, wherein the basic blocks include a plurality of first basic blocks and a second basic block;
calculating a first variable type output corresponding to an unknown variable by the processing device for each of the plurality of first basic blocks and storing the first variable type outputs by a storage device;
calculating a second variable type input corresponding to the unknown variable by the processing device for the second basic block according to the first variable type outputs;
calculating a second variable type generation corresponding to the unknown variable by the processing device for the second basic block when the second basic block comprises a primitive instruction corresponding to the unknown variable;
calculating a second variable type kill corresponding to the unknown variable by the processing device for the second basic block;
calculating a second variable type output corresponding to the unknown variable by the processing device for the second basic block according to the second variable type input, the second variable type generation and the second variable type kill; and
storing the second variable type output by the storage device.

12. The variable inference method of claim 11, wherein the processing device calculates the second variable type input corresponding to the unknown variable according to the following equation:

$$\text{TYPE}_{in}(n_i)=\text{T\_MERGE}(\text{TYPE}_{out}(n_j),\text{TYPE}_{out1}(n_k))$$
$$\forall n_j,n_k\in\text{Pred}(n_i)$$

where, $n_i$ represents the second basic block, $\text{Pred}(n_i)$ represents the first basic blocks, $n_j$ and $n_k$ represent any two of the first basic blocks, and T_MERGE(*) represents a type fusion operation.

13. The variable inference method of claim 11, wherein the primitive instruction comprises two source operands, a destination operand and an operation, and the processing device calculates the second variable type generation corresponding to the unknown variable according to the source operands, the destination operand and the operation.

14. The variable inference method of claim 11, wherein the processing device calculates the second variable type output corresponding to the unknown variable according to the following equation:

$$\text{TYPE}_{out}(n_i)=\text{TYPE}_{gen}(n_i)\cup(\text{TYPE}_{in}(n_i)-\text{TYPE}_{kill}(n_i))$$

where, $n_i$ represents the second basic block, $\cup$ represents a union operation, $\text{TYPE}_{out}(n_i)$, $\text{TYPE}_{gen}(n_i)$, $\text{TYPE}_{in}(n_i)$ and $\text{TYPE}_{kill}(n_i)$ represent the second variable type output, the second variable type generation, the second variable type input and the second variable type kill respectively.

15. The variable inference method of claim 14, wherein if the unknown variable is re-defined in the second basic block, then the processing device kills the second variable type input previously inputted according to the second variable type kill.

16. The variable inference method of claim 11, further comprising:
calculating a first variable value output corresponding to an unknown variable by the processing device for each of the first basic blocks, and storing the first variable value outputs by the storage device;
calculating a second variable value input corresponding to the unknown variable by the processing device for the second basic block according to the first variable value outputs;
calculating a second variable value generation corresponding to the unknown variable by the processing device for the second basic block when the second basic block comprises a primitive instruction corresponding to the unknown variable;
calculating a second variable value kill corresponding to the unknown variable by the processing device for the second basic block;
calculating a second variable value output corresponding to the unknown variable by the processing device for the second basic block according to the second variable value input, the second variable value generation and the second variable value kill; and
storing the second variable value output by the storage device.

17. The variable inference method of claim 16, wherein the processing device calculates the second variable value input corresponding to the unknown variable according to the following equation:

$$\text{VALUE}_{in}(n_i)=\text{V\_MERGE}(\text{VALUE}_{out}(n_i),\text{VALUE}_{out1}(n_k))\forall n_j,n_k\in\text{Pred}(n_i)$$

where, $n_i$ represents the second basic block, $\text{Pred}(n_i)$ represents the first basic blocks, $n_j$ and $n_k$ represent any two of the first basic blocks, and V_MERGE(*) represents a value fusion operation.

18. The variable inference method of claim 16, wherein the primitive instruction comprises two source operands, a destination operand and an operation, and the processing device calculates the second variable value generation corresponding to the unknown variable according to the source operands, the destination operand and the operation.

19. The variable inference method of claim 16, wherein the processing device calculates the second variable value output corresponding to the unknown variable according to the following equation:

$$VALUE_{out}(n_i) = VALUE_{gen}(n_i) \cup (VALUE_{in}(n_i) - VALUE_{kill}(n_i))$$

where, $n_i$ represents the second basic block, $\cup$ represents a union operation, and $VALUE_{out}(n_i)$, $VALUE_{gen}(n_i)$, $VALUE_{in}(n_i)$ and $VALUE_{kill}(n_i)$ represent the second variable value output, the second variable value generation, the second variable value input and the second variable value kill respectively.

20. The variable inference method of claim 19, wherein if the unknown variable is re-defined in the second basic block, then the processing device kills the second variable value input previously inputted according to the second variable value kill.

* * * * *